United States Patent [19]

Nathan et al.

[11] Patent Number: 4,873,631
[45] Date of Patent: Oct. 10, 1989

[54] POINT OF SALE AUTOMATIC BACK-UP SYSTEM AND METHOD

[75] Inventors: Robert H. Nathan; Lawrence A. Hislop, both of Atlanta, Ga.

[73] Assignee: NCR Corporation, Dayton, Ohio

[21] Appl. No.: 185,590

[22] Filed: Apr. 25, 1988

[51] Int. Cl.$^4$ .............................................. G06F 15/21
[52] U.S. Cl. ............................... 364/405; 364/268.1; 364/285.1; 364/943.92; 371/9.1; 371/8.2
[58] Field of Search ... 364/401, 405, 187, 900 MS File, 364/200 MS File; 371/7-12, 66

[56] References Cited

U.S. PATENT DOCUMENTS

| | | | |
|---|---|---|---|
| 3,054,560 | 9/1962 | Hartley | 235/151 |
| 3,303,474 | 2/1967 | Moore et al. | 340/172.5 |
| 3,544,777 | 12/1970 | Winkler | 340/174 |
| 3,623,014 | 11/1971 | Doelz et al. | 340/172.5 |
| 3,636,331 | 1/1972 | Amrehn | 235/151.12 |
| 3,725,861 | 4/1973 | Hancock | 340/146.1 |
| 3,803,568 | 4/1974 | Higashide | 340/213 R |
| 4,012,717 | 3/1977 | Censier et al. | 340/172.5 |
| 4,076,961 | 2/1978 | Holsinger et al. | 179/2 DP |
| 4,118,772 | 10/1978 | Takada | 364/119 |
| 4,266,271 | 5/1981 | Chamoff et al. | 364/401 |
| 4,358,823 | 11/1982 | McDonald et al. | 364/200 |
| 4,359,718 | 11/1982 | Payen | 340/825.03 |
| 4,455,645 | 6/1984 | Mijioka et al. | 370/16 |
| 4,468,750 | 8/1984 | Chamoff et al. | 364/405 |
| 4,477,895 | 10/1984 | Casper et al. | 370/16 |
| 4,589,090 | 5/1986 | Downing et al. | 364/900 |
| 4,590,554 | 5/1986 | Glazer et al. | 364/200 |
| 4,610,013 | 9/1986 | Long et al. | 371/9 |
| 4,623,383 | 11/1986 | Konen | 340/825.01 |
| 4,654,048 | 3/1987 | Anderson et al. | 364/200 |
| 4,665,520 | 5/1987 | Strom et al. | 364/200 |
| 4,677,614 | 6/1987 | Circo | 370/86 |
| 4,718,002 | 1/1988 | Carr | 364/200 |

FOREIGN PATENT DOCUMENTS

| | | | |
|---|---|---|---|
| 0149443 | 8/1984 | Japan | 371/8 |
| 0239743 | 10/1986 | Japan | 371/8 |
| 2173977 | 10/1986 | United Kingdom | 371/11 |

OTHER PUBLICATIONS

Arndt et al, "Backup Terminal Provides Extra Capability During Normal Operation of Multi-Terminal Transaction Processing System", *IBM Technical Disclosure Bulletin*, vol. 23, No. 6, Nov. 1980, pp. 2464–2465.
Kasavana, *Computer Systems for Foodservice Operations*, Van Nostrand Reinhold, New York, 1984, pp. 73–77.

*Primary Examiner*—Jerry Smith
*Assistant Examiner*—David Huntley
*Attorney, Agent, or Firm*—Wilbert Hawk, Jr.; Albert L. Sessler, Jr.; Richard W. Lavin

[57] ABSTRACT

A point-of-sale system includes a plurality of terminals in which one of the terminals is selected to be a primary terminal and the remaining terminals are selected to be secondary terminals. Program means in the primary terminal will store the data messages received from the secondary terminals and transmit the received data messages to memory means in each of the secondary terminals. Each secondary terminal will determine if it has received all the data messages. If there is found to be a discrepancy in the number of data message received, the secondary terminal will notify the primary terminal of such a discrepancy and the primary terminal will supply the missing data messages.

7 Claims, 4 Drawing Sheets

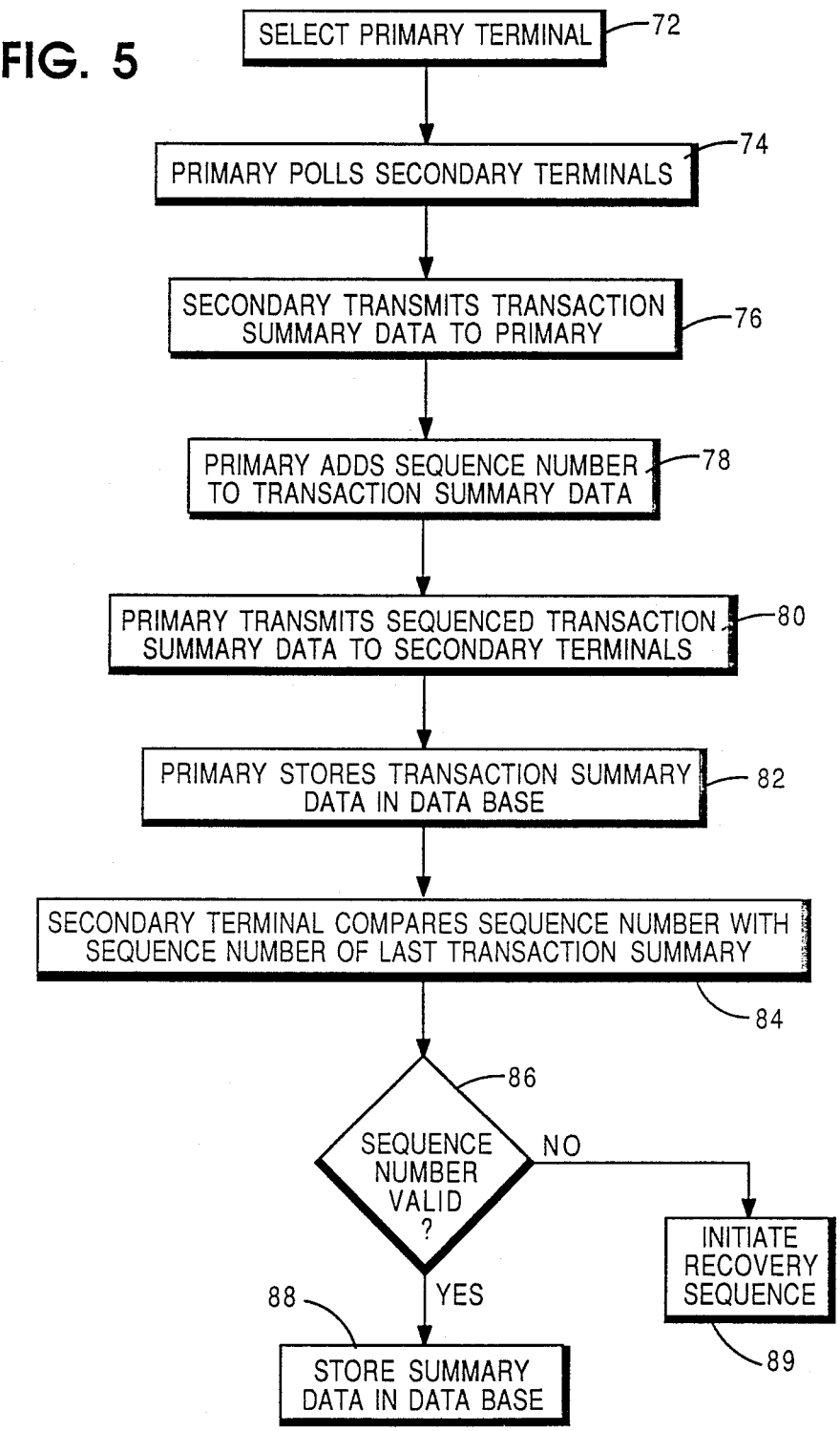

4,873,631

POINT OF SALE AUTOMATIC BACK-UP SYSTEM AND METHOD

BACKGROUND OF THE INVENTION

The present invention relates to data processing systems and more particularly to a system and method for providing an automatic back-up of a primary terminal associated with a cluster of secondary terminals in a point of sale system when the primary terminal is disabled from operation.

Retail sales transactions are brief exchanges between the operator and a point of sale (POS) terminal pertinent to a specific customer's purchases. The key values of a POS system are to provide timely information to the operators and to accumulate data pertaining to the sales transactions so that extensive reporting of the days of operation is possible at a later time. A typical food service POS system may consist of 2-15 POS terminals which are physically scattered around the retail establishment. These terminals must have simultaneous access to a "data base" which may contain pricing and other business information. Further, it is highly desirable that a failure of an individual terminal will not cause a total system failure or even loss of any significant data. Additionally, the number of POS terminals that are being operated during the day of operation may vary due to varying business conditions. Thus, in a fast food operation, the number of terminals that are required to handle lunch sales may be different from that required for either breakfast or dinner sales. Thus, the particular POS terminal that will be removed from the system during the day is not known beforehand.

Back-up systems found in the prior art have been limited to a designated back-up processor associated with the main processor for taking control of the data processing system when the main or primary processors is disabled. In order to prevent any disruptions of the processing operation, the back-up processor may receive the same data that the primary processor receives by listening to the communication channel over which the primary processor communicates with the secondary processors to detect the time that the primary processor is disabled so that the back-up processor can continue the communication without notifying the secondary processors that such an interruption has occurred. In U.S. Pat. No. 4,623,883, which is assigned to the assignee of the present invention, there is disclosed a communication switch which enables the the back-up processor to become the primary processor upon the switch detecting the disabling of the main or primary processor. In copending U.S. patent application No. 002,544, which is assigned to the the assignee of the present invention, there is disclosed a POS processing system in which the primary terminal supplies price look-up data to the secondary terminals in the system and in which a secondary terminal is designated as the back-up terminal to provide continuous data servicing to the secondary terminals when the primary terminal is disabled. Designating a terminal to be a primary or a back-up terminal requires that the designated terminal have a different hardware and software construction which adds to the complexity and cost of the system.

SUMMARY OF THE INVENTION

There is provided a method for preventing the loss of data in a data processing system which includes a plurality of data terminal devices connected in parallel comprising the steps of selecting one of the data terminal devices as the primary terminal device and the remaining terminal devices as secondary terminal devices, transmitting the data messages generated by the secondary terminal devices to the primary terminal devices, storing the data messages generated by the secondary terminal device in a first storage unit in the primary terminal devices, transmitting the data messages stored in the first storage unit to each of the secondary terminals in response to the storing of the data messages in the first storage unit and storing the data messages transmitted by the primary terminal in a second storage unit in each of the secondary terminal devices.

It is accordingly an object of the present invention to provide a method for establishing that all the data terminal devices in a data processing system each contain the same data that is generated by all the terminal devices during an operation of the data processing system.

It is a further object of this invention to provide each of the data terminal devices with all the data generated by the terminals in the system when a terminal device is removed from the data processing system and later inserted back into the system.

It is another object of this invention to provide a method for updating all the data in each of the terminal devices of a data processing system at the time the data is generated by each of the individual terminal devices.

The above and other objects of the present invention will become more apparent when taken in conjunction with the following description and drawings wherein like characters indicate like parts and such drawings form a part of the specification.

BRIEF DESCRIPTION OF THE DRAWINGS

FIG. 5 is a flow chart of a data storage operation in the system; and

DETAILED DESCRIPTION OF THE INVENTION

Figure 1:
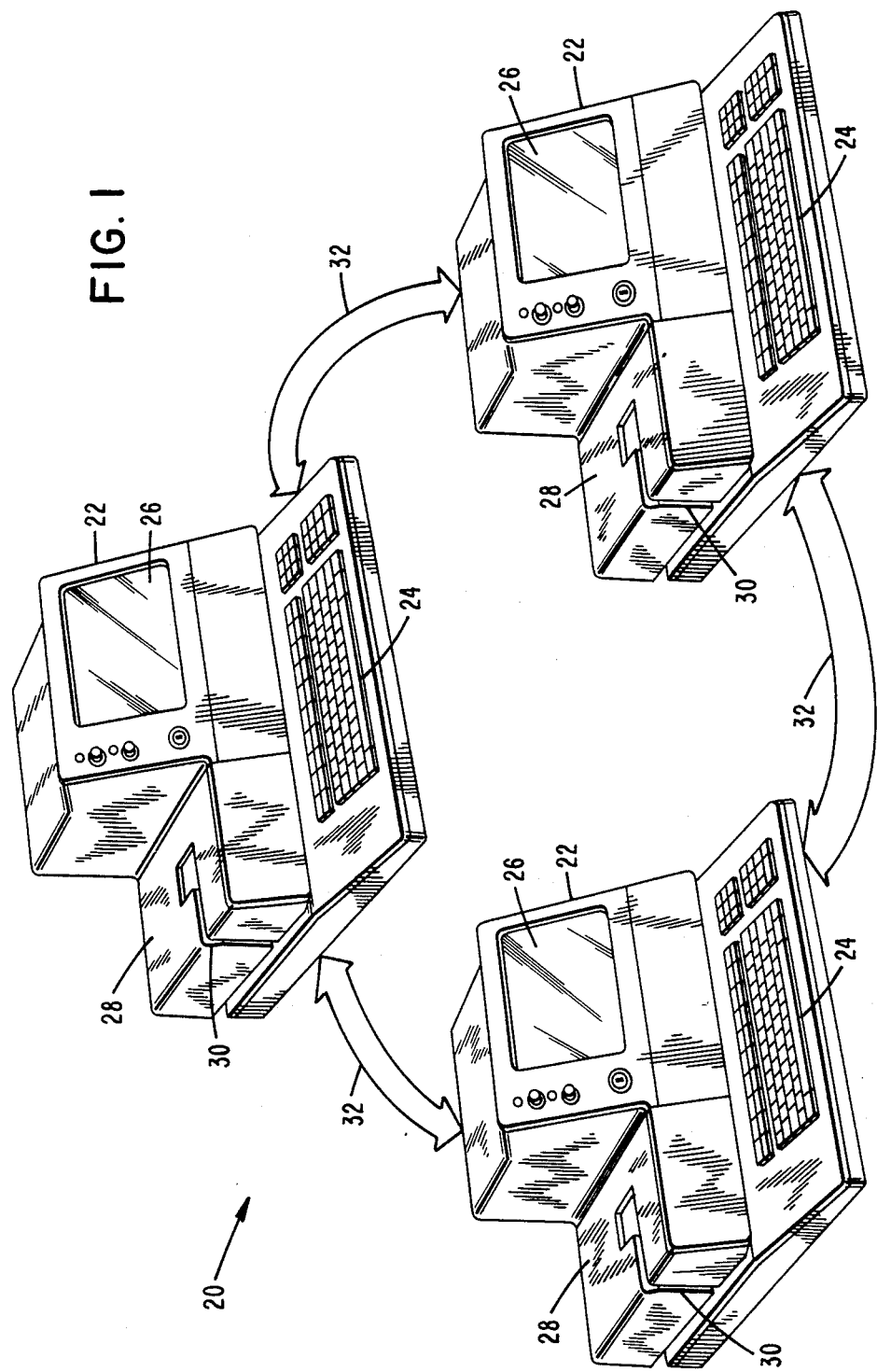
FIG. 1 is a perspective view of a data processing system including a plurality of data terminal devices each of which may be either a primary or a secondary terminal in the data processing system.

FIG. 1 is a perspective view of the data processing system generally indicated by the numeral 20 in which the method of this invention may be used. The processing system 20 relates to a food service system which may include a number of terminal devices 22, some of which may be located at the checkout stations in the retail establishment. Another terminal device may be found at the manager's station while other terminal devices may be found in the kitchen, all of which are used in processing transactions. The terminal devices 22 may be conventional terminal devices like the NCR 2157 which is commercially available from the NCR Corporation of Dayton, Ohio.

Each of the terminal devices 22 (FIG. 1) in the system 20 includes a keyboard 24, the use of which generates a transaction summary data message which includes the items purchased or ordered, the price of each item and the total purchase price. The terminal device 22 further includes a display 26 which displays the transaction data message generated by the keyboard 24 and a printer 28 which prints on a general record member (not shown) all the transaction data generated and a receipt record on which is printed the data associated with the transaction being performed if the terminal is being used at a checkout station. The receipt record is issued through a slot 30 in the printer 28, and is then given to the purchaser. Each of the terminal devices 22 is connected to every other terminal device in the processing system over a local area network which includes a communication cable 32. An example of such a network is the NCR data link control (DLC) network which is used by the NCR Corporation of Dayton, Ohio.

Figure 2:
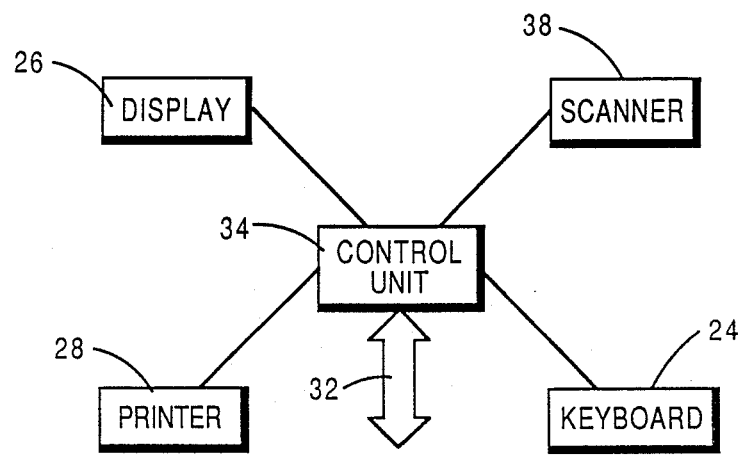
FIG. 2 is a general schematic diagram, in block form, of a data terminal device utilized in the present data processing system.

Referring now to FIG. 2, there is shown a schematic diagram, in block form, of the terminal device 22 which includes a control unit 34 coupled to the communication cable 32 which controls the operation of the terminal device 22. Coupled to the control unit 34 is the keyboard 24, the display 26 and the printer 28. If the terminal device is used at the checkout station, a scanner 38 may be employed to read UPC bar code labels from which the transaction data is generated.

Figure 3:
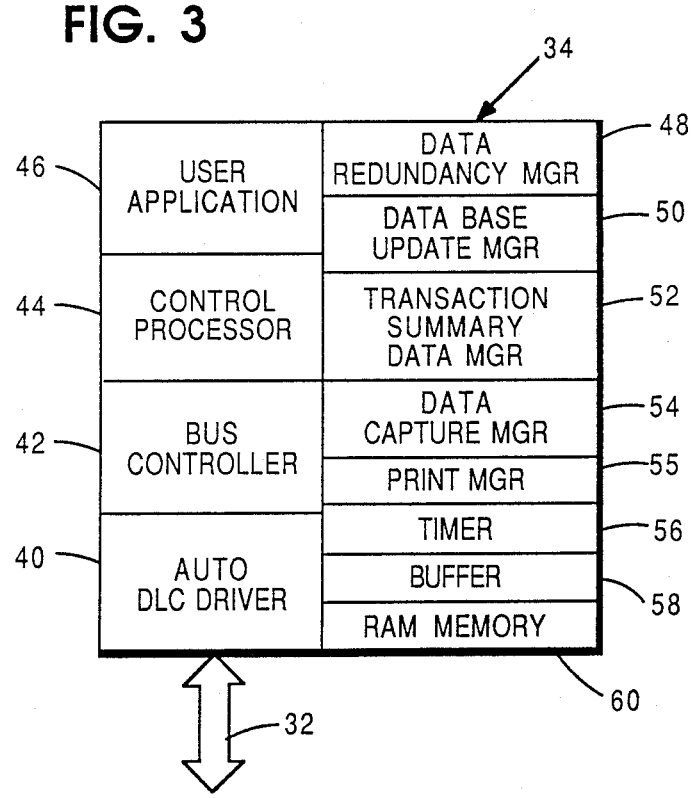
FIG. 3 is a general schematic diagram, in block form, of the control unit in each of the data terminal devices.

Referring now to FIG. 3, there is shown a schematic diagram, in block form, of the control unit 34 (FIG. 2) of the terminal device 22. Included in the control unit is an automatic DLC driver 40 which includes both hardware and software for coupling the terminal device 22 to the communication cable 32. The driver 40 also includes a table (not shown) which contains a list for polling the other terminal devices 22 in the system 20 if the terminal device is designated as the primary terminal.

Associated with the DLC driver 40 is a communication controller 42 which controls the overall communications routines for the terminal device 22. As will be described more fully hereinafter, if the designated primary terminal device fails or is removed from the processing system, transmissions in the form of polling signals will stop on the communication cable 32, enabling the communication controller 42 in each of the terminal devices 22 to detect such condition. In response to detecting this condition, the controller 42 will notify the DLC driver 40 of such a condition which initiates a sequence of events to select another of the terminal devices 22 (FIG. 1) as the primary terminal.

Further included in the control unit 34 is a conventional control processor 44 for controlling the operation of the terminal device 22, a user application 46 which represents the customer's application software for the terminal device 22, a data redundancy manager (DRM) 48 which represents the software for storing the data in all of the terminal devices 22 of the system during operation of the system, a data base update manager 50 which represents the software for updating the data stored in each of the terminal devices, a transaction summary data manager 52 which represents the software for controlling the storing and the transferring of the transaction summary data messages generated by the operation of the terminal devices to the other terminal devices, a data capture manager 54 which represents the software associated with one of the terminals for printing on a hard disk (not shown) detailed information on all of the transactions that occur during a day of operation of the system, a print manager 55 which represents the software for controlling the printing of the receipt and journal record members (not shown), a timer 56 which is used in generating a communication time-out period for use in selecting a primary terminal device, data buffers 58 which are used for temporarily storing data that is to be transmitted from or into the terminal device and a RAM memory 60 for storing data associated with the operation of the processing system 20.

Figure 4:
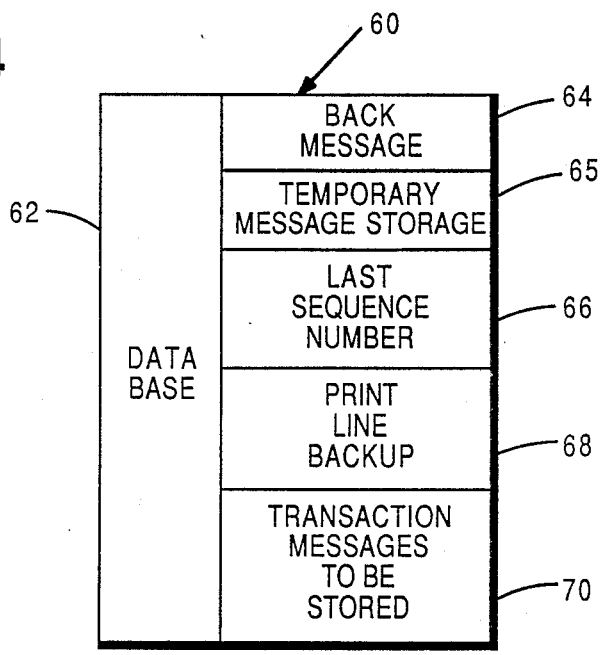
FIG. 4 is a schematic diagram, in block form, of the memory unit in the control unit of FIG. 3.

Referring now to FIG. 4, there is shown a schematic diagram, in block form, of the RAM memory 60 (FIG. 3) of the terminal control unit 34 which includes a data base section 62 in which are stored all of the transaction summary data messages generated by the terminal devices 22 in the system together with price look-up data, a back message section 64 in which is stored a limited number of the previously generated transaction summary data messages, a temporary message storage section 65 in which is stored a data message transmitted from a secondary terminal device, a last sequence number section 66 in which is stored the sequence number of the last transaction summary data message that was stored in the data base section 62, a print line back-up section 68 in which are stored the lines of the transaction summary data messages that have not been printed and are waiting to be printed and a transaction message to be stored section 70 in which are stored the transaction data messages waiting to be stored in the data base section 62.

Referring now to FIG. 5, there is shown a flow chart of a data transfer operation. In the operation of the data processing system 20, each of the terminal devices 22 will contain the same program for operating the terminal device and will be assigned a priority ranking. The priority ranking takes the form of assigning a time-out period of a predetermined duration with the highest priority terminal device having the shortest time-out period and the lowest priority terminal device having the longest time-out period. As fully disclosed in the previously cited co-pending U.S. application Ser. No. 002,544, at the time the system is powered-up or when the acting primary terminal device is removed from the system, the system 20 will select (block 72) a primary terminal by having the communication controller 42 (FIG. 3) in each of the terminal devices 22 enable its associated DLC driver 40 (FIG. 3) to start the operation of the timer 56. When the timer 56 time-outs, the driver will listen for polling signals on the communication cable 32. If the driver 40 fails to detect the presence of any polling signals on the cable, it will assume the primary terminal function and start polling the other terminal devices 22 on the communication cable 32. The remaining terminal devices will detect the polling signals generated by the new primary terminal device before each of their associated timers time-out, thus resulting in the terminal device assuming the role of a secondary terminal device.

The terminal device selected as the primary terminal will initiate a polling sequence of all the terminal devices in the system to determine whether or not they are active. The DLC driver 40 (FIG. 3) of the primary terminal has a poll list of the terminal devices included in the processing system 20. If a secondary terminal device 22 is active, it will transmit an acknowledgment response to the polling message generated by the primary terminal. If one of the secondary terminal devices does not respond to the polling message, a "no" response will occur and the driver 40 will keep a log file for "bad" or inoperative terminal devices. Once the primary terminal device has established the status of all the active terminals in the system 20, it begins to poll (block 74) each one of them for any messages which they might have.

During the operation of each of the secondary terminal devices 22, the transaction data generated as a result of processing each of the purchased merchandise items will be temporarily stored under the control of the transaction summary data manager 52 (FIG. 3) in the buffer 58 (FIG. 3) until the transaction data is totalized. The data generated is identified as the transaction summary data message. Upon detecting a poll message from the primary terminal device, the secondary terminal device will transmit (block 76), under the control of its DRM manager 48, the transaction summary data message over the communication cable 32 to the primary terminal device. The primary terminal device will add (block 78) a sequence number to the transaction data message, store the message in the temporary message section 65 (FIG. 4) and transmit (block 80) the message over the cable 32 to each of the secondary terminal devices 22. After the data message has been transmitted to all of the secondary terminal devices, the DRM manager 48 (FIG. 3) will transfer the data message from the temporary storage section 65 to the data base section 62 (FIG. 4) of the memory 58 and in the back message section 64 of the memory. The DRM manager 48 in each of the secondary terminal devices will compare (block 84) the sequence number found with the currently received transaction data message with the sequence number stored in section 66 of the memory 58 (FIG. 4) of the last transaction data message stored in the data base section 62 of its associated memory 58 to see if they follow in the proper order (block 86). If the sequence number compares favorably with the last sequence number, the DRM manager 48 will store (block 88) the transaction data message in the data base section 62 under the control of the data base update manager 50 (FIG. 3). If it is found that there is a gap between the sequence numbers compared, the secondary terminal device will initiate a summary data message recovery operation (block 89). It will thus be seen that as each of the transaction data messages is generated by the secondary terminal devices, the message will be stored in all the terminals so that no individual terminal failure can cause a total system failure or even loss of significant data.

Figure 6:
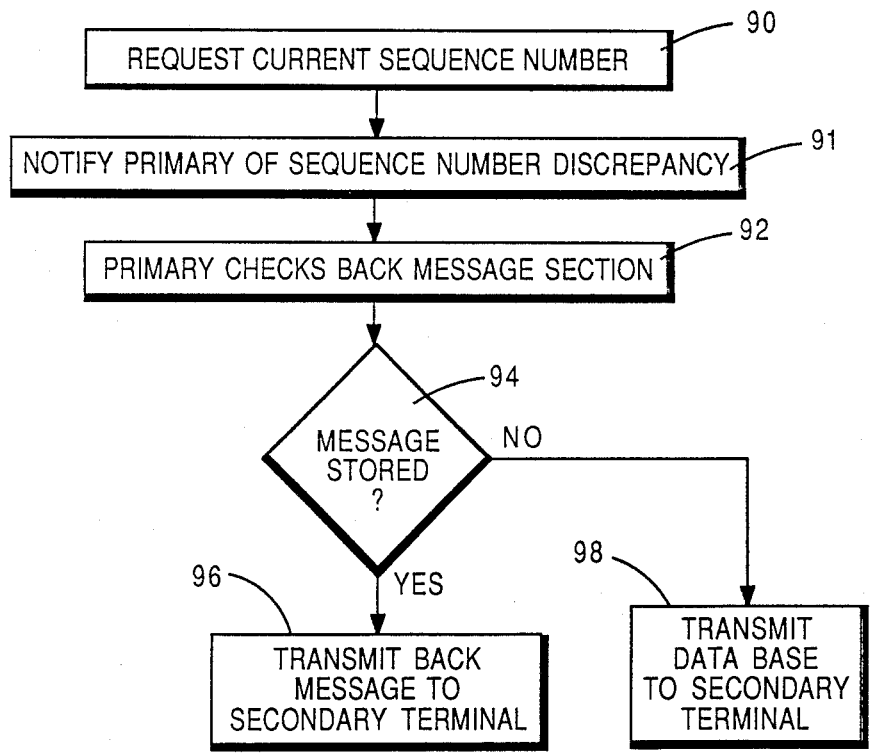
FIG. 6 is a flow chart of a data recovery operation in the system.

Referring now to FIG. 6, there is shown a flow chart of a data message recovery operation. As previously described, one or more of the terminal devices 22 may be removed from the system due to changing business operating conditions. When the terminal device is reconnected to the system, it will send a request for the current sequence number (Block 90) outputted by the primary terminal. In comparing the current sequence number with the last sequence number received by the terminal device, the terminal device will detect the discrepancy between the sequence numbers and so notify (block 91) the primary terminal of such a discrepancy. In response to receiving this message from the secondary terminal device, the primary terminal device will check (block 92) the back transaction message section 64 (FIG. 4) in the memory 58 to see if the missing transaction messages are stored therein (block 94). If they are, the primary terminal device will poll the affected terminal device and transmit (block 96) the missing transaction data messages to the terminal device enabling the data base section 62 of the secondary terminal device to be current with the remaining secondary terminal devices. If the back transaction message section 64 of the primary terminal device does not contain the missing transaction data messages, the primary terminal device will transmit all the data messages stored in the data base section 62 in its memory 58 (FIG. 3) to the secondary terminal device.

As the data redundancy manager 48 (FIG. 3) of the primary terminal device is storing the current transaction message received from a secondary terminal device in the data base section 62 of its memory 58, its associated printer 28 (FIG. 1), under the control of the print manager 55 (FIG. 3), will be enabled to print on a journal record member (not shown), data pertaining to all the transactions generated by the system during a predetermined time period together with other pertinent data describing the transaction and other control features that are required to be recorded. Usually such a terminal device is assigned to the manager of the retail establishment, enabling him or her to have access to the latest generated data.

The data redundancy manager 48 (FIG. 3) of the primary terminal device will store in section 70 of the memory 58 (FIG. 4) a queue of transaction messages which have been received from the secondary terminal devices but have not been applied to the data base section 62. The transaction summary data manager 52 (FIG. 3) will store in the back-up section 68 of the memory 58 (FIG. 4) the lines of the transaction messages which have not been printed by its associated printer 28.

While the principles of the invention have now been made clear in an illustrated embodiment, it will be obvious to those skilled in the art that many modifications of structure, arrangements, elements and components can be made which are particularly adapted for specific environments and operating requirements without departing from these principles. The appended claims are therefore intended to cover and embrace any such modifications, within the limits only of the true spirit and scope of the invention.

What is claimed is:

1. A method for preventing the loss of data in a data processing system which includes a plurality of data terminal devices and in which each of the terminal devices is coupled to every other terminal device in the system comprising the steps of:

selecting one of the data terminal devices as a primary terminal device and the remaining terminal devices as secondary terminal devices;

transmitting a data message generated by one of the secondary terminal devices to the primary terminal device;

storing the data message generated by the secondary terminal device in a first storage unit in the primary terminal device;

transmitting the data message stored in the first storage unit to each of the secondary terminal devices in response to the storing of the data message in the first storage unit;

storing the data message transmitted by the primary terminal device in a second storage unit in each of the secondary terminal devices; and transmitting the data stored in the first storage unit to a third storage unit in the primary terminal device after the data message has been transmitted to all of the secondary terminal devices.

2. The method of claim 1 which further includes the steps of:
  adding a sequence number consecutively to each of the data messages stored in said first storage unit as they are received from the secondary terminal devices;
  storing the sequence number of the last data message transmitted by the primary terminal device in a fourth storage unit in each of the secondary terminal devices;
  comparing the sequence number of the data message transmitted from the primary terminal device to the secondary terminal device with the last sequence number stored in the fourth storage unit for detecting if the secondary terminal device has received all the data messages; and
  notifying the primary terminal device of the last sequence number stored in said fourth storage unit upon finding a discrepancy between the sequence number of the data message received and the last sequence number stored in said fourth storage unit.

3. The method of claim 2 which further includes the steps of storing in a fifth storage unit in the primary terminal device a predetermined number of data messages and their associated sequence numbers transmitted to the secondary terminal devices, comparing the last sequence number received from the secondary terminal device with the last sequence number stored in the fifth storage unit and, upon finding a discrepancy between said last sequence number received from the secondary terminal device and the last sequence number stored in the fifth storage unit, transmitting the data messages associated with any sequence numbers which were not previously transmitted to the secondary terminal device.

4. The method of claim 3 which further includes the steps of sending all of the data messages stored in said third storage unit to the secondary terminal device upon not finding the last sequence number received from the secondary terminal device in the fifth storage unit.

5. A point-of-sale back-up system comprising:
  a plurality of terminal devices, each being assigned a priority rating;
  means for selecting the highest priority terminal device as a primary terminal device and the remaining terminals devices as secondary terminal devices;
  a network coupling each of the terminal devices in the back-up system with every other terminal device in the system;
  first memory means in the primary terminal device for storing a data message received from a secondary terminal device;
  second memory means in the primary terminal device for storing all the data messages transmitted between the primary terminal device and the secondary terminal devices; and
  first program means in said primary terminal device for storing in said first memory means a data message received from a secondary terminal device and transmitting the stored data message to each of the secondary terminal devices in response to receiving the data message from the secondary terminal device, said program means transferring the data message from the first memory means to the second memory means after the data message has been transmitted to all of the secondary terminal devices.

6. The point-of-sale system of claim 5 in which said first program means in the primary terminal device adds a sequence number to each of the data messages which are stored in said second memory means and transmitted to all of the secondary terminal devices, said system further including third memory means located in each of the terminal devices for storing the sequence number of the last data message received from the primary terminal device and also including second program means in each of the terminal devices for checking the sequence number of the received data message with the last sequence number stored in said third memory means to detect if the secondary terminal device has received all the data messages transmitted by the primary terminal device to all the secondary terminal devices.

7. The point-of-sale system of claim 6 which further includes;
  a fourth memory means for storing a predetermined number of data messages transmitted from the primary terminal device to each of the secondary terminal devices;
  said second program means transmitting the sequence number of the last data message stored in said third memory means to said primary terminal device in response to detecting an interruption between the last sequence number stored in said third memory means and the sequence number of the data message transmitted to the secondary terminal device from the primary terminal device; and
  said first program means comparing the sequence number transmitted by the secondary terminal device with the last sequence number stored in said fourth memory means for transmitting any data message not previously sent to the secondary terminal device.

* * * * *